(12) United States Patent
Daniel et al.

(10) Patent No.: US 7,324,516 B2
(45) Date of Patent: Jan. 29, 2008

(54) DATA PACKET HEADER CONVERSION

(75) Inventors: William F. Daniel, Louisville, CO (US); David M. Kissel, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 1087 days.

(21) Appl. No.: 10/217,644

(22) Filed: Aug. 14, 2002

(65) Prior Publication Data

US 2004/0032870 A1   Feb. 19, 2004

(51) Int. Cl.
*H04J 3/16* (2006.01)
*H04L 12/56* (2006.01)
*H04L 12/66* (2006.01)

(52) U.S. Cl. .................. 370/392; 370/401; 370/466
(58) Field of Classification Search ............ 370/392, 370/401, 466
See application file for complete search history.

(56) References Cited

U.S. PATENT DOCUMENTS

| | | | | |
|---|---|---|---|---|
| 5,293,379 A | * | 3/1994 | Carr | 370/474 |
| 5,878,045 A | * | 3/1999 | Timbs | 370/466 |
| 6,002,692 A | * | 12/1999 | Wills | 370/465 |
| 6,243,395 B1 | * | 6/2001 | Fujimori et al. | 370/466 |
| 6,452,939 B1 | * | 9/2002 | Yang et al. | 370/465 |
| 6,731,649 B1 | * | 5/2004 | Silverman | 370/466 |
| 6,882,637 B1 | * | 4/2005 | Le et al. | 370/349 |
| 6,954,460 B2 | * | 10/2005 | DeMars | 370/392 |
| 6,996,624 B1 | * | 2/2006 | LeCroy et al. | 709/231 |
| 7,061,936 B2 | * | 6/2006 | Yoshimura et al. | 370/474 |
| 7,088,723 B2 | * | 8/2006 | Yang | 370/395.52 |
| 2002/0080756 A1 | * | 6/2002 | Coppola et al. | 370/338 |
| 2002/0097723 A1 | * | 7/2002 | Tourunen et al. | 370/392 |
| 2003/0185201 A1 | * | 10/2003 | Dorgan | 370/352 |
| 2004/0264433 A1 | * | 12/2004 | Melpignano | 370/349 |
| 2005/0249205 A1 | * | 11/2005 | O'Brien et al. | 370/389 |

* cited by examiner

*Primary Examiner*—Alpus H. Hsu
(74) *Attorney, Agent, or Firm*—Grossman, Tucker, Perreault & Pfleger, PLLC

(57) ABSTRACT

A method of converting a data packet that has a header includes storing the data packet and generating a header template having a plurality of static fields. The method further includes generating at least one dynamic field and merging the header template with the header. The method further includes inserting the at least one dynamic field to form a converted header.

21 Claims, 6 Drawing Sheets

Egress Packet Buffer and Header Template

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Source Port Number      |      Destination Port Number  |
+-+-+-+-+-+-+-+-+-+-+-+-+-+-+-+-+-+-+-+-+-+-+-+-+-+-+-+-+-+-+-+-+
|            UDP Length           |           UDP Checksum        |
+-+-+-+-+-+-+-+-+-+-+-+-+-+-+-+-+-+-+-+-+-+-+-+-+-+-+-+-+-+-+-+-+
                              UDP Header
```

Prior Art

Fig. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Payload Type |M|  CC   |X|P|Ver|          Sequence Number       |
+-+-+-+-+-+-+-+-+-+-+-+-+-+-+-+-+-+-+-+-+-+-+-+-+-+-+-+-+-+-+-+-+
|                            Timestamp                           |
+-+-+-+-+-+-+-+-+-+-+-+-+-+-+-+-+-+-+-+-+-+-+-+-+-+-+-+-+-+-+-+-+
|                  Synchronization Source Identifier             |
+-+-+-+-+-+-+-+-+-+-+-+-+-+-+-+-+-+-+-+-+-+-+-+-+-+-+-+-+-+-+-+-+
                              RTP Header
```

Prior Art

Fig. 5

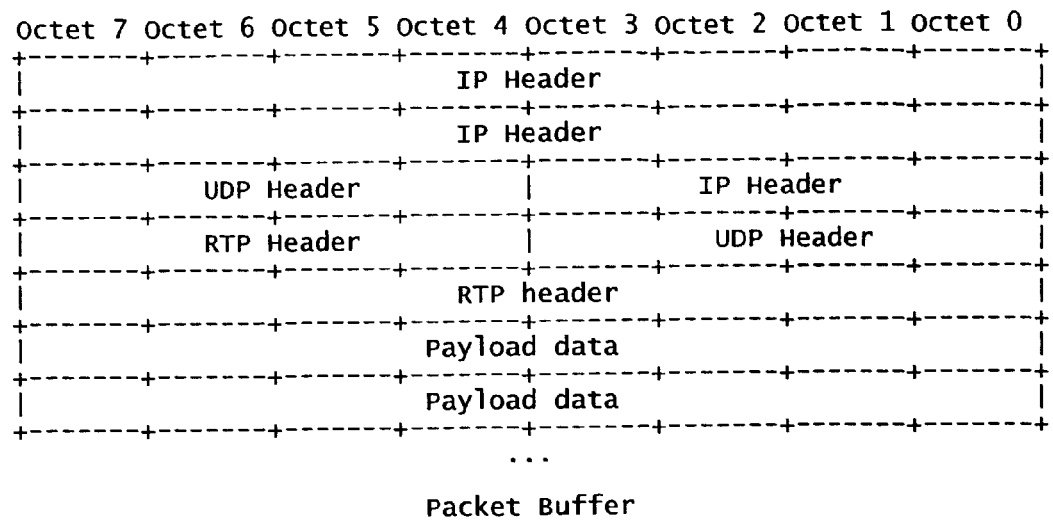
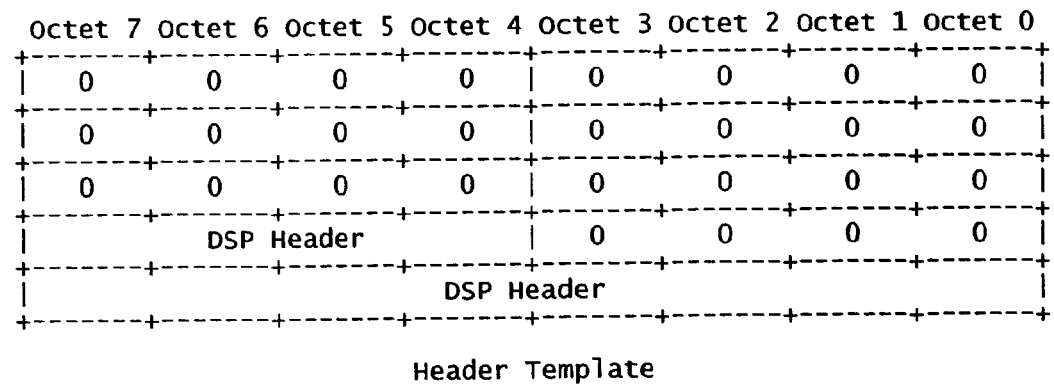
Ingress Packet Buffer and Header Template
Fig. 8

DATA PACKET HEADER CONVERSION

FIELD OF THE INVENTION

One embodiment of the present invention is directed to digital data. More particularly, one embodiment of the present invention is directed to a conversion of a digital data packet header.

BACKGROUND INFORMATION

Voice telephone calls have traditionally been carried over circuit-based transmission facilities on the Public Switched Telephone Network ("PSTN"). However, increasingly more and more voice telephone calls are carried over the Internet and other similarly structured packet-based networks, and are referred to as Voice over Internet Protocol ("VoIP") telephone calls. In addition, many voice telephone calls are carried over a combination of the PSTN and the Internet.

The telephone calls that are carried over both the PSTN and the Internet require format changes as the voice data switches between networks. For example, data going from the PSTN to the Internet must be broken up into packets and the appropriate header must be created and appended to each packet. Since any VoIP implementation is constrained by real-time limitations, it is extremely important to create or convert the packet headers in the most efficient way possible.

Based on the foregoing, there is a need for a method and apparatus to efficiently create and convert headers for VoIP and other packets.

BRIEF DESCRIPTION OF THE DRAWINGS

FIG. 4 illustrates the format of a UDP header.

FIG. 5 illustrates the format of a RTP header.

FIG. 8 illustrates an example of packet buffer data and a header template in accordance with one embodiment of the present invention.

DETAILED DESCRIPTION

One embodiment of the present invention is a packet processor that converts propriety headers to VoIP headers by using a pre-formatted header template. The header template includes data that does not change during the conversion.

Figure 1:
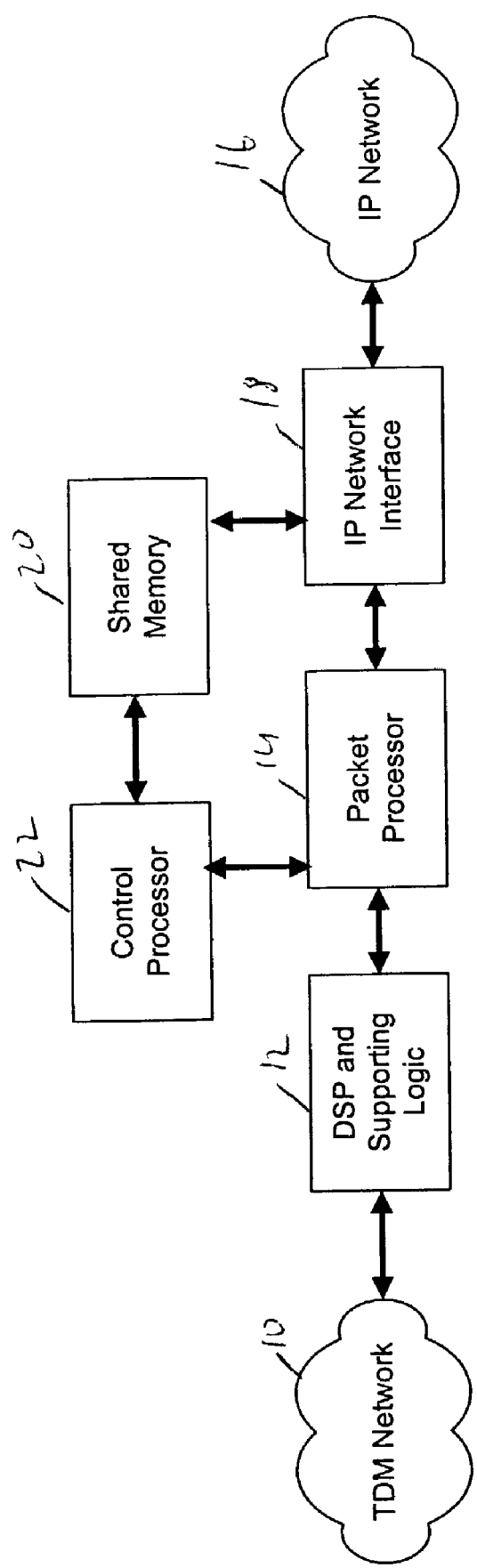
FIG. 1 is a block diagram of a communication system that includes one embodiment of the present invention.

FIG. 1 is a block diagram of a communication system that includes one embodiment of the present invention. The communication system includes two networks: a time division multiplex ("TDM") network 10 and an Internet Protocol ("IP") network 16. TDM network 10 could be any circuit-switched telephone network such as the PSTN. IP network 16 in one embodiment is the Internet.

The devices 12, 14, 18, 20 and 22 of FIG. 1 are used to convert voice data from TDM network 10 to packets that are transmitted on IP network 16, and vice versa. A digital signal processor ("DSP") 12 and supporting logic receives voice samples on TDM network 10 and converts the samples into data packets that represent the level and frequency information of the TDM data. In one embodiment, DSP 12 is the IXS1000 DSP from Intel Corp. The data packets that are output from DSP 12 have a proprietary header that can vary in format depending on the type of DSP that is implemented.

Packet traffic on the Internet is typically carried using the Transmission Control Protocol/Internet Protocol ("TCP/IP") end-to-end protocol. Rather than using TCP as the transport protocol, Internet telephony applications typically use the much simpler User Datagram Protocol ("UDP") to provide the transport layer function. The delivery monitoring function, supported by sequence numbering and time stamping, is provided by the Real-time Transport Protocol ("RTP"), including its performance monitoring partner protocol RTP Control Protocol ("RTCP").

The communication system of FIG. 1 further includes a packet processor 14 that receives data packets from DSP 12 that have a proprietary header, and that converts the packets into standard packets that are compatible with IP network 16. In one embodiment, the data portion of the packets remain the same after conversion, and the header is converted. In one embodiment, packet processor 14 is the IXP 1200 packet processor from Intel Corp.

A control processor 22 assists packet processor 14 in the set up and tear down of VoIP telephone calls. A memory 20 stores programming functionality and buffers packets that are to be converted by packet processor 14. An IP network interface 18 transmits packets to IP network 16, and vice versa.

Figure 2:
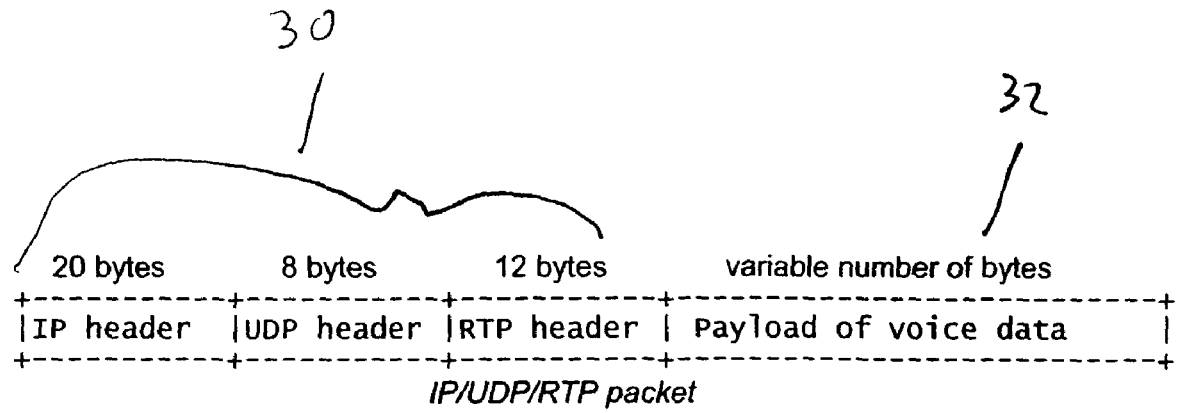
FIG. 2 illustrates the format of a super-header that includes an IP header, a UDP header, and an RTP header.

In one embodiment, Internet telephony packets transmitted over IP network 16 are prepended with a "super-header" that includes headers defined by the IP, UDP, and RTP standards. FIG. 2 illustrates the format of a super-header 30 that includes an IP header, a UDP header, and an RTP header that are generated by packet processor 14. Super-header 30 can be appended onto a payload 32 to form a complete packet.

Figure 3:
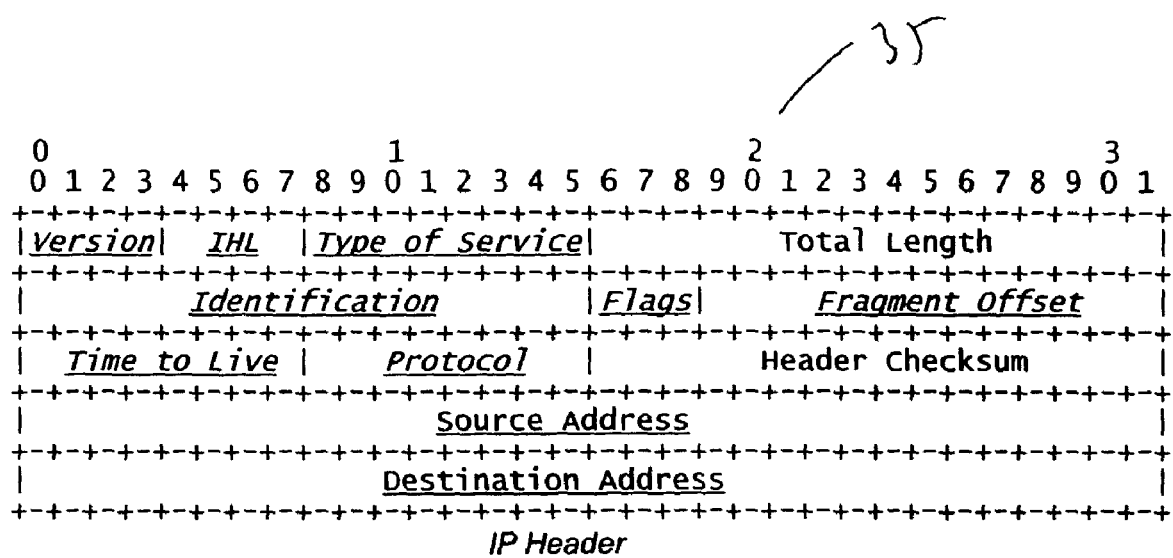
FIG. 3 illustrates the format of an IP header.

FIG. 3 illustrates the format of an IP header 35. IP header 35 is defined in Request for Comment ("RFC") 791.

FIG. 4 illustrates the format of a UDP header 40. UDP header 40 is defined in RFC 768.

FIG. 5 illustrates the format of a RTP header 45. RTP header 45 is defined in RFC 1889.

Figure 6:
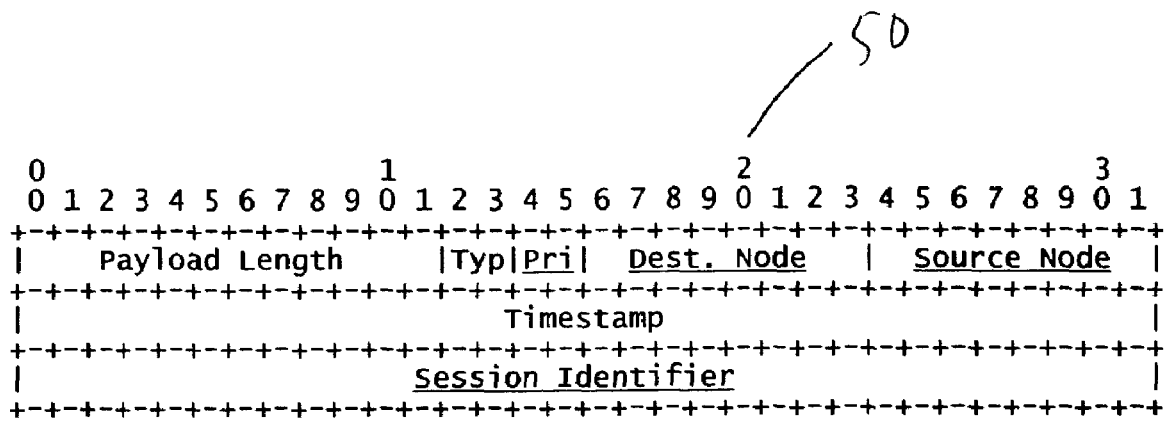
FIG. 6 illustrates the format of a DSP header in accordance with one embodiment of the present invention.

In addition to converting data coming from TDM network 10 and destined for IP network 16, packet processor 14 also receives IP packets from IP network 16 and converts them so that they can be received by DSP 12 and transmitted to TDM network 10. In this direction, packet processor 14 must convert the super-header of the IP network packets to the proprietary header used by DSP 12. FIG. 6 illustrates the format of a DSP header 50 in accordance with one embodiment of the present invention.

Each of the headers illustrated in FIGS. 3-6 are formed by header fields (e.g., the "Version", "IHL" and "Type of Service" header fields of the IP header of FIG. 3). In one embodiment, each header field falls into one of three categories:

1) Header fields that are the same for ALL packets sent by the VoIP application. In FIGS. 3-6, these fields are illustrated as underlined italic type;

2) Header fields that are connection-specific (i.e., they are constant for a specific telephone call, but may change between calls). In FIGS. 3-6, these fields are illustrated as underlined regular type; and 3) Header fields that may change from one packet to the next on the same telephone call. In FIGS. 3-6, these fields are shown in regular type and can be referred to as "dynamic fields".

In other embodiments, different applications will divide the header fields differently among the above categories, but the categories themselves will remain the same.

One embodiment of the present invention creates packet headers in the most efficient way possible through the use of a "header template" that contains the unchanging data in header fields from categories 1 and 2 above (referred to as "static fields"). The header template is positioned so that it can be written directly to the packet buffer, with modifications limited to the category 3 fields above. In one embodiment in which the IXP1200 packet processor is used, the field modifications are made in the Synchronous Dynamic Random Access Memory ("SDRAM") transfer registers of the IXP 1200 before writing the completed header to the packet buffer.

In the direction towards IP network 16, the header fields are populated by packet processor 14 from one of two different sources: (1) the internal header prepended to each voice data payload by DSP 12; or (2) the header template stored in shared memory 20.

Packets received from DSP 12 by packet processor 14 are stored in packet buffers. In one embodiment, since the IPX1200 packet processor addresses these buffers in dynamic RAM with a 64-bit("quadword") granularity, and the DSP header is not an integral multiple of 64 bits in length, the payload of packets written with the DSP header on a quadword alignment will not begin on a quadword boundary. Because of the byte alignment restrictions imposed by the IXP1200 (and similar limitations imposed by other packet processors) efficient transmission requires that the resulting IP/UDP/RTP header must be contiguous with the packet data in the packet buffer. Therefore, in one embodiment the header template is stored so that is aligned to match the payload. The header template includes data for all the underlined fields in FIGS. 3-5 (i.e., category 1 and 2 fields) and zeros for the other fields (i.e., category 3 fields).

Figure 7:
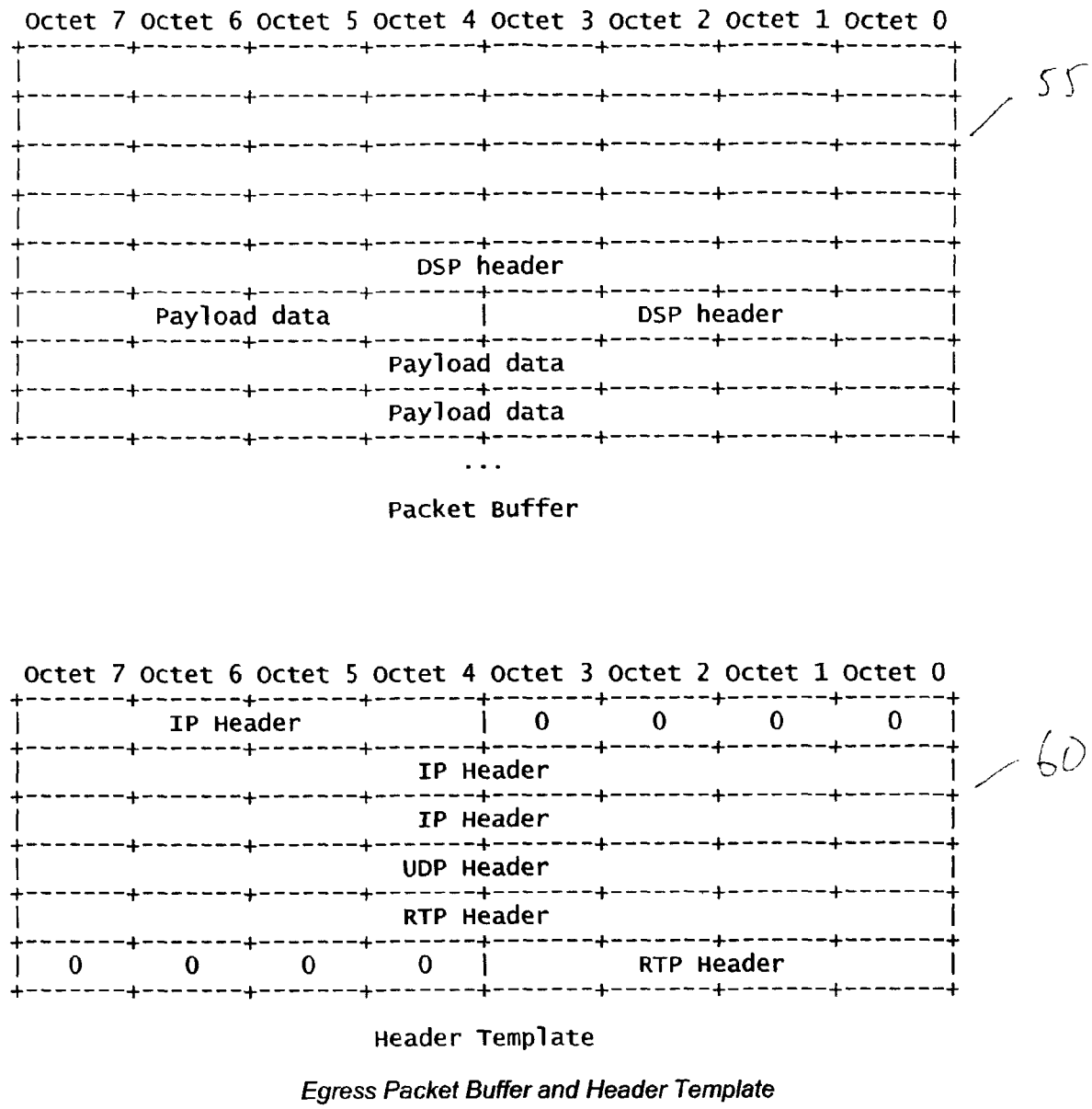
FIG. 7 illustrates an example of packet buffer data and a header template in accordance with one embodiment of the present invention.

FIG. 7 illustrates an example of packet buffer data 55 and a header template 60 in accordance with one embodiment of the present invention in the direction towards IP network 16. The alignment of packet buffer data 55 and header template 60 allows header template 60 to be copied over the first five quadwords of packet buffer data 55 and "ORed" with the sixth quadword (after setting the lowest four octets of the sixth quadword to zero) to create the basic header that includes category 1 and 2 fields. Individual category 3 dynamic fields that are needed to create the final IP/UDP/RTP header are also written into the packet buffer data. In one embodiment, the DSP header information in quadwords 5 and 6 of packet buffer data 55 must be saved in registers before the copy operation, since this information is required to create the final header. The transmission of the final packet after packet buffer data 55 is merged with header template 60 begins with octet 4 of the first word in the embodiment shown in FIG. 7.

In the direction toward TDM network 10, the changing fields are populated by packet processor 14 from either: (1) the IP/UDP/RTP header of each received packet; or (2) a header template stored in shared memory 20 by control processor 22.

Packets received from IP network 16 and IP network interface 18 by packet processor 14 are stored in packet buffers. In one embodiment, since the IXP 1200 addresses these buffers in dynamic RAM with a 64-bit quadword granularity, and the IP/UDP/RTP header is an integral multiple (i.e., multiple of 5) of 64 bits in length, the payload of packets written with the IP/UDP/RTP header on a quadword alignment will begin on a quadword boundary. Because of the byte alignment restrictions imposed by the IXP1200 (and similar limitations imposed by other packet processors) efficient transmission requires that the resulting DSP header must be contiguous with the packet data in the packet buffer. Therefore, in one embodiment the header template is stored so that is aligned to match the payload. The header template includes data for all the underlined fields in FIGS. 3-5 (i.e., category 1 and 2 fields) and zeros for the other fields (i.e., category 3 fields).

FIG. 8 illustrates an example of packet buffer data 65 and a header template 70 in accordance with one embodiment of the present invention in the direction toward TDM network 10. The alignment of packet buffer data 65 and header template 70 allows header template 70 to be copied over the first five quadwords of packet buffer data 55 to create the basic header that includes category 1 and 2 fields. Individual category 3 dynamic fields that are needed to create the final DSP header are also written into the packet buffer data. In one embodiment, the IP/UDP/RTP header information in quadwords 1-5 of packet buffer data 65 must be saved in registers before the copy operation, since this information is required to create the final header. The transmission of the final packet after packet buffer data 65 is merged with header template 70 begins with octet 4 of the fourth word in the embodiment shown in FIG. 8.

As described, embodiments of the present invention use a header template to create or convert headers. The use of a stored header template allows greater real-time efficiency and therefore greater throughput of packets for the Internet telephony communication system. The byte alignment of the template obviates the need to read, shift and write each word in the buffer to create alignment with the incoming packet payload. Since this header creation must be done for each packet, it has a substantial impact on real-time system performance.

The header pre-formatting implementation of embodiments of the present invention is applicable to any packet processing system in which the converted packets are formatted with a header that must be created with a fixed byte alignment in order to match the alignment of the payload data. This could apply to any voice-over-packet system.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of converting a data packet from a first format compatible with a first network to a second format compatible with a second network, said method comprising:

storing the data packet, wherein the data packet has a first header in the first format;

generating a header template having a plurality of static fields, the header template including, for an egress packet buffer, an IP header configured to be written to a first three quadwords of the egress packet buffer, an UDP header configured to be written to a fourth quadword of the egress packet buffer and an RTP header configured to be written to a fifth quadword of the egress packet buffer, the header template including, for an ingress packet buffer, a DSP header configured to be written to a fourth quadword and a fifth quadword of the ingress packet buffer;

generating at least one dynamic field; and merging the header template with the first header and inserting the at least one dynamic field to form a converted header in the second format.

2. The method of claim 1, wherein the data packet is stored in a packet buffer.

3. The method of claim 1, wherein the first header is a DSP proprietary header.

4. The method of claim 1, wherein the converted header is an IP/UDP/RTP header.

5. The method of claim 1, wherein the static fields are constant for all packets on a communication system.

6. The method of claim 1, wherein the static fields are constant for a duration of a telephone call on a communication system.

7. The method of claim 1, wherein the data packet has a payload, further comprising:

aligning the header template with the payload.

8. A method of converting a first data packet from a first format compatible with a first network to a second format compatible with a second network, comprising:

receiving the first data packet from the first network, the first data packet comprising a header having a plurality of fields in the first format;

generating a header template having a plurality of static fields, the header template including, for an egress packet buffer, an IP header configured to be written to a first three quadwords of the egress packet buffer, an UDP header configured to be written to a fourth quadword of the egress packet buffer and an RTP header configured to be written to a fifth quadword of the egress packet buffer, the header template including, for an ingress packet buffer, a DSP header configured to be written to a fourth quadword and a fifth quadword of the ingress packet buffer; and merging the header template with the first data packet, wherein at least one of the static fields replaces at least one of the plurality of data packet fields.

9. The method of claim 8, wherein the merging generates a second data packet having the second format, further comprising:

transmitting the second data packet on the second network.

10. The method of claim 9, wherein the first network is a TDM network, and the second network is an IP network.

11. The method of claim 9, wherein the first data packet comprises a payload, further comprising:

aligning the header template with the payload.

12. The method of claim 8, wherein at least one of the static fields is constant.

13. The method of claim 12, wherein at least one of the static fields is constant for a duration of a telephone call.

14. The method of claim 8, further comprising generating a dynamic field.

15. A computer readable medium having instructions stored thereon that, when executed by a processor, cause the processor to:

store a data packet, wherein the data packet has a first header in a first format compatible with a first network;

generate a header template having a plurality of static fields, the header template including, for an egress packet buffer, an IP header configured to be written to a first three quadwords of the egress packet buffer, an UDP header configured to be written to a fourth quadword of the egress packet buffer and an RTP header configured to be written to a fifth quadword of the egress packet buffer, the header template including, for an ingress packet buffer, a DSP header configured to be written to a fourth quadword and a fifth quadword of the ingress packet buffer;

generate at least one dynamic field; and merge the header template with the first header and insert the at least one dynamic field to form a converted header in a second format compatible with a second network.

16. The computer readable medium claim 15, wherein the data packet is stored in a packet buffer.

17. The computer readable medium claim 15, wherein the first header is a DSP proprietary header.

18. The computer readable medium claim 15, wherein the converted header is an IP/UDP/RTP header.

19. The computer readable medium claim 15, wherein the static fields are constant for all packets on a communication system.

20. The computer readable medium claim 15, wherein the static fields are constant for a duration of a telephone call on a communication system.

21. The computer readable medium claim 15, wherein the data packet has a payload, the instructions further causing the processor to:

align the header template with the payload.

\* \* \* \* \*

UNITED STATES PATENT AND TRADEMARK OFFICE
CERTIFICATE OF CORRECTION

PATENT NO. : 7,324,516 B2  Page 1 of 1
APPLICATION NO. : 10/217644
DATED : January 29, 2008
INVENTOR(S) : Daniel et al.

It is certified that error appears in the above-identified patent and that said Letters Patent is hereby corrected as shown below:

In column 6, line 31, in Claim 16, after "medium" insert -- of --.

In column 6, line 33, in Claim 17, after "medium" insert -- of --.

In column 6, line 35, in Claim 18, after "medium" insert -- of --.

In column 6, line 37, in Claim 19, after "medium" insert -- of --.

In column 6, line 40, in Claim 20, after "medium" insert -- of --.

In column 6, line 43, in Claim 21, after "medium" insert -- of --.

Signed and Sealed this

Fifth Day of August, 2008

JON W. DUDAS
*Director of the United States Patent and Trademark Office*